(12) United States Patent
Tucci et al.

(10) Patent No.: US 10,926,738 B1
(45) Date of Patent: Feb. 23, 2021

(54) METHOD AND SYSTEM FOR SELF-LEARNING RADIO NODE POSITIONS WITHIN A VEHICLE STRUCTURE

(71) Applicant: Robert Bosch GmbH, Stuttgart (DE)

(72) Inventors: Michael Tucci, Westland, MI (US); Jack Murfett, Stuttgart (DE); Ewen Christopher, Boronia (AU); Nicholas Wadsley, St Kilda East (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/716,612

(22) Filed: Dec. 17, 2019

(51) Int. Cl.
*B60R 25/24* (2013.01)
*B60R 25/22* (2013.01)
*B60R 25/40* (2013.01)

(52) U.S. Cl.
CPC .............. *B60R 25/24* (2013.01); *B60R 25/22* (2013.01); *B60R 25/40* (2013.01); *B60R 2325/105* (2013.01); *B60R 2325/205* (2013.01)

(58) Field of Classification Search
CPC .... H04W 84/18; G07C 9/00309; B60R 25/24
See application file for complete search history.

(56) References Cited

U.S. PATENT DOCUMENTS

| | | | |
|---|---|---|---|
| 7,750,841 B2 | 7/2010 | Oswald et al. | |
| 8,712,343 B2 | 4/2014 | Lal et al. | |
| 9,363,685 B2 | 6/2016 | Jain | |
| 9,852,560 B2 | 12/2017 | Bauman et al. | |
| 9,885,773 B2 | 2/2018 | Hehn et al. | |
| 10,083,556 B1 | 9/2018 | Jain et al. | |
| 10,124,768 B1 | 11/2018 | Bocca et al. | |
| 10,223,849 B2 | 3/2019 | Jain et al. | |
| 10,239,494 B2 | 3/2019 | Spiess | |
| 10,328,898 B2 | 6/2019 | Golsch et al. | |
| 2007/0090965 A1* | 4/2007 | McCall | G08B 21/24 340/8.1 |
| 2010/0094482 A1* | 4/2010 | Schofield | G08G 1/205 701/2 |
| 2010/0171642 A1* | 7/2010 | Hassan | G01S 13/825 340/992 |
| 2018/0186332 A1 | 7/2018 | Bocca et al. | |
| 2018/0265039 A1 | 9/2018 | Jain et al. | |

* cited by examiner

*Primary Examiner* — Fabrico R Murillo Garcia
(74) *Attorney, Agent, or Firm* — Maginot, Moore & Beck LLP

(57) ABSTRACT

A vehicle access system is disclosed having the plurality of system nodes for localizing a target portable device. The plurality of system nodes includes a master ECU that is asymmetrically installed at a predetermined location within the vehicle. The plurality of system nodes includes a plurality of slave system nodes. The plurality of slave system nodes includes an assigned system node that is asymmetrically installed at a predetermined location within the vehicle and a plurality of unassigned system nodes that are installed arbitrarily at any one of a plurality predetermined possible installation locations within the vehicle. The known installation locations of the assigned system node and the master ECU are used to self-learn the unknown installation location of each unassigned system node, for example after manufacturing assembly or repair of the vehicle access system.

20 Claims, 6 Drawing Sheets

METHOD AND SYSTEM FOR SELF-LEARNING RADIO NODE POSITIONS WITHIN A VEHICLE STRUCTURE

FIELD

The device and method disclosed in this document relates to a vehicle access system and, more particularly, to and ultra-wideband based vehicle access system.

BACKGROUND

Unless otherwise indicated herein, the materials described in this section are not prior art to the claims in this application and are not admitted to the prior art by inclusion in this section.

Passive Entry/Passive Start (PEPS) systems enable a user to conveniently lock and unlock a vehicle, as well as start the engine of the vehicle, without the need to physically insert or otherwise handle the key for the vehicle. Instead, the user simply carries a key FOB or smart device on his or her person and the PEPS system automatically detects that the key FOB or smart device is within a predefined range of the vehicle and enables to user to lock or unlock the vehicle. Likewise, when the user presses a pushbutton to start the engine of the vehicle, the PEPS system automatically determines whether the key FOB or smart device is located within the vehicle and, if so, enables the user to start the engine.

In some PEPS systems, one or more radio antennas are installed throughout the vehicle and are used to determine the location of the key FOB or smart device. However, in order to determine the location of the key FOB or smart device, the installation location of each radio antenna within the vehicle must be known. After an initial manufacturing assembly of the vehicle or after a maintenance repair process, the vehicle computer must be able to determine the installation location of each radio antenna within the vehicle. Accordingly, it would be advantageous to provide a vehicle access system that is configured to self-learn the installation location of each radio antenna within the vehicle.

SUMMARY

A method of operating a vehicle access system is disclosed, the vehicle access system having a plurality of system nodes installed throughout a vehicle, each system node in the plurality of system nodes including a radio transceiver configured to wirelessly communicate with each other system node in the plurality of system nodes, the plurality of system nodes including (i) a first system node installed at first installation location within the vehicle, (ii) a second system node installed at second installation location within the vehicle, and (iii) a plurality of additional system nodes, each installed at one of a plurality of possible installation locations within the vehicle. The method comprises determining, for a third system node from the plurality of additional system nodes, (i) a first distance between the third system node and the first system node by operating the radio transceivers of the third system node and the first system node and (ii) a second distance between the third system node and the second system node by operating the radio transceivers of the third system node and the second system node. The method comprises determining, with a processor of the vehicle access system, a third installation location, selected from the plurality of possible installation locations, at which the third system node is actually installed based on the first distance and the second distance.

A vehicle access system is disclosed. The vehicle access system comprises a plurality of system nodes installed throughout a vehicle, each system node in the plurality of system nodes including a radio transceiver configured to wirelessly communicate with each other system node in the plurality of system nodes, the plurality of system nodes including (i) a first system node installed at first installation location within the vehicle, (ii) a second system node installed at second installation location within the vehicle, and (iii) a plurality of additional system nodes, each installed at one of a plurality of possible installation locations within the vehicle. The vehicle access system comprises a processor operably connected to the plurality of system nodes. The processor is configured to determine, for a third system node from the plurality of additional system nodes, (i) a first distance between the third system node and the first system node by operating the radio transceivers of the third system node and the first system node and (ii) a second distance between the third system node and the second system node by operating the radio transceivers of the third system node and the second system node. The processor is configured to determine a third installation location, selected from the plurality of possible installation locations, at which the third system node is actually installed based on the first distance and the second distance.

BRIEF DESCRIPTION OF THE DRAWINGS

The foregoing aspects and other features of the vehicle access system are explained in the following description, taken in connection with the accompanying drawings.

DETAILED DESCRIPTION

Figure 1:
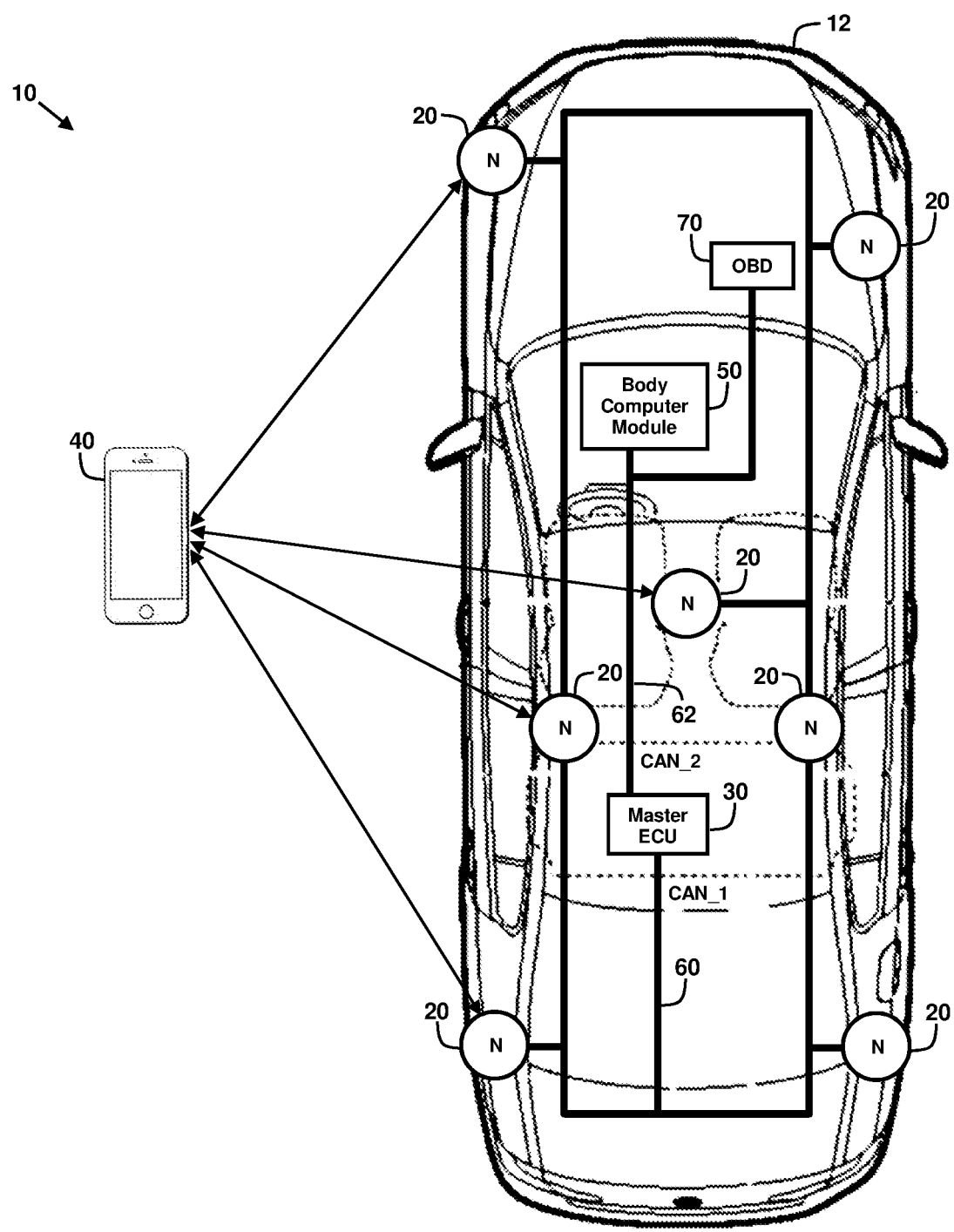
FIG. 1 shows an exemplary embodiment of a vehicle access system for a vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Vehicle Access System

With reference to FIGS. 1 and 2A-2C, an exemplary embodiment of a vehicle access system 10 for a vehicle 12 is described. As shown in FIG. 1, the vehicle access system 10 includes a plurality of system nodes 20, 30 arranged at various locations of the vehicle 12. The vehicle access system 10 is configured to localize a target portable device 40 in order to provide passive entry/passive start (PEPS) features, such as enabling unlocking of the vehicle 12 when the target portable device 40 is within a predetermined range of the vehicle 12, enabling starting of the vehicle 12 when the target portable device 40 is inside the vehicle 12, and automatically locking the vehicle 12 when the target portable device 40 is no longer within a predetermined range of the vehicle 12. In addition, the vehicle access system 10 is advantageously configured to provide self-learning of the installation locations of the system nodes 20, 30 within the vehicle. This is particularly useful, for example, during manufacturing assembly of the vehicle or after a maintenance repair process. In these scenarios, certain ones of the system nodes 20 may have unknown positions within the vehicle 12 as a result of being newly installed or replaced in the vehicle 12.

It will be appreciated that the particular number of system nodes 20, 30 and particular locations of the system nodes 20, 30 will depend on the desired accuracy and performance, as well as the particular make and model of the vehicle 12. In one embodiment, the vehicle access system 10 includes at least a minimum number of system nodes 20, 30 that are necessary required for satisfying a particular Thatcham category requirements (e.g., enabling vehicle lock/unlock within two meter perimeter of vehicle and vehicle start when a target portable device is in the vehicle). The system nodes 20, 30 are configured to communicate with target portable device 40 and, in particular, to enable determination of a position of the target portable device 40. In at least one embodiment, ultra-wideband (UWB) communications are utilized between the system nodes 20, 30 and the target portable device 40 to enable localization of target portable device 40.

In terms of network definition, the system nodes 20, 30 include a master electronic control unit (ECU) 30 (which may also be referred to herein as the "master system node") and a plurality of slave system nodes 20. The master ECU 30 is connected to each of the slave system nodes 20 via a first communication bus 60, preferably in the form of a controller area network (CAN) bus (CAN_1). The master ECU 30 communicates with the slave system nodes 20, via the first communication bus 60, to operate the slave system nodes 20 and to collect ranging data from the slave system nodes 20 for the purpose of localizing the target portable device 40. In at least one embodiment, the master ECU 30 is configured to process the ranging data collected by the system nodes 20, 30 to localize the target portable device 40.

In some embodiments, the master ECU 30 is configured to pair with or otherwise communicate with the target portable device 40 using at least one additional communication technique, such as Bluetooth® or Bluetooth Low Energy® (BLE), aside from that which is used for localization of the localization of target portable device 40. Alternatively, in some embodiments, one of the slave system nodes 20 is instead configured to pair with or otherwise communicate with the target portable device 40 using at least one additional communication technique, such as Bluetooth® or BLE, aside from that which is used for localization of the localization of target portable device 40. In either case, this additional communication channel may be used for setup and configuration of the passive entry/passive start (PEPS) features of the vehicle access system 10.

In some embodiments, the master ECU 30 is further connected to a body computer module (BCM) 50 (or other vehicle computer) via a second communication bus 62, preferably in the form of a further CAN bus (CAN_2). The BCM 50 is configured to control and monitor various body electronics functions in the vehicle 12 including functions such as exterior and interior lighting, locks, pushbutton ignition, windows, wipers, air-conditioning, heating functions, and parking aids.

In some embodiments, the master ECU 30 is further connected to a diagnostic computer and/or port 70 via the second communication bus 62, via a further connection, or indirectly via the BCM 50. In one embodiment, the diagnostic computer and/or port 70 comprises a standardized on-board diagnostics computer and/or port (e.g., OBD-II), or equivalent that is known in the art.

Figure 2A:
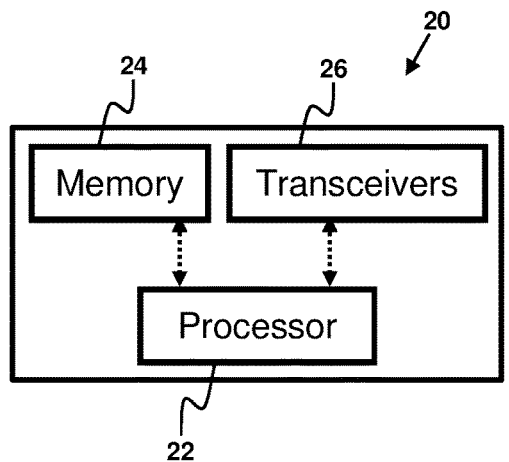
FIGS. 2A, 2B, and 2C show exemplary embodiments of a slave system node, a master ECU, and a target portable device, respectively, of the vehicle access system of FIG. 1.

FIG. 2A shows an exemplary embodiment of a slave system node 20. In the illustrated embodiment, each slave system node 20 comprises a processor 22, memory 24, and one or more radio transceiver(s) 26. The memory 24 is configured to store program instructions that, when executed by the processor 22, enable the respective slave system node 20 to perform various operations described elsewhere herein, including localization of the target portable device 40. The memory 24 may be of any type of device capable of storing information accessible by the processor 22, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 22 may include a system with a central processing unit, graphics processing units, multiple processing units, dedicated circuitry for achieving functionality, programmable logic, or other processing systems. In one embodiment, the processor 22 includes logic and/or discreet hardware for communicating via the first communication bus 60 (e.g., a suitable CAN bus controller).

The radio transceiver(s) 26 at least include an ultra-wideband transceiver and corresponding antenna configured to communicate with the target portable device 40 and with other system nodes 20, 30, as well as any processors, memories, oscillators, or other hardware conventionally included in a UWB radio module. The radio transceiver(s) 26 may further include various other devices configured for wireless communication with other electronic devices, including the ability to send communication signals and receive communication signals. In some embodiments, the radio transceiver(s) 26 comprise multiple ultra-wideband transceivers and/or multiple ultra-wideband antennas arranged in an array. In one embodiment, the radio transceiver(s) 26 of at least one of the slave system nodes 20 further includes a Bluetooth® or Bluetooth Low Energy® (BLE) transceiver configured to communicate with the target portable device 40.

Figure 2B:
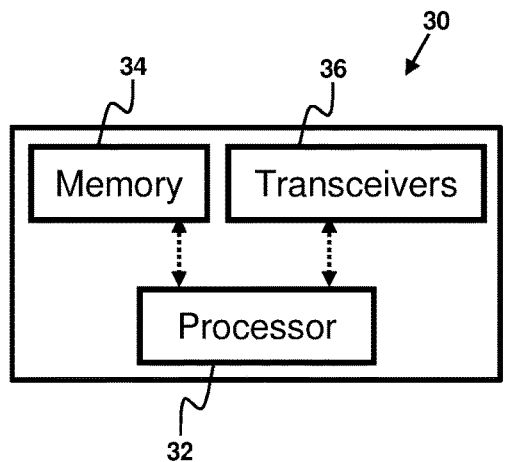

FIG. 2B shows an exemplary embodiment of a master ECU 30. In the illustrated embodiment, the master ECU 30 comprises a processor 32, memory 34, and one or more radio transceiver(s) 36. The memory 34 is configured to store program instructions that, when executed by the processor 32, enable the master ECU 30 to perform various operations described elsewhere herein, including localization of the target portable device 40. The memory 34 may be of any type of device capable of storing information accessible by the processor 32, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 32 may include a system with a central processing unit, graphics processing units, multiple processing units, dedicated circuitry for achieving functionality, programmable logic, or other processing systems. In one embodiment, the processor 32 includes logic and/or discreet hardware for communicating via the first communication bus 60 and the second communication bus 62 (e.g., a suitable CAN bus controller).

The radio transceiver(s) 36 at least include an ultra-wideband transceiver and corresponding antenna configured to communicate with the target portable device 40 and with other system nodes 20, as well as any processors, memories, oscillators, or other hardware conventionally included in a UWB radio module. The radio transceiver(s) 36 may further include various other devices configured for wireless communication with other electronic devices, including the ability to send communication signals and receive communication signals. In some embodiments, the radio transceiver(s) 36 comprise multiple ultra-wideband transceivers and/or multiple ultra-wideband antennas arranged in an array. In one embodiment, the radio transceiver(s) 36 further include a Bluetooth® or BLE transceiver configured to communicate with the target portable device 40.

Figure 2C:
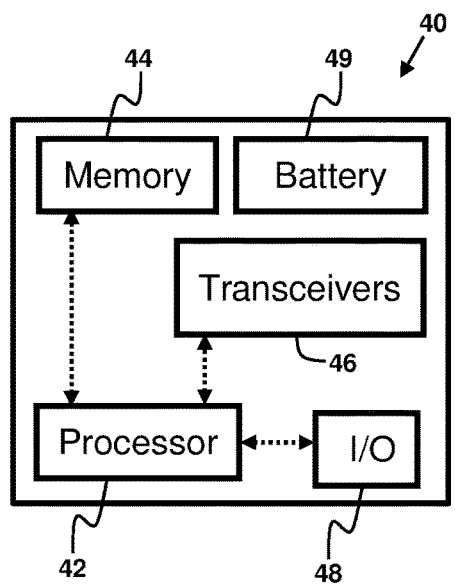

FIG. 2C shows an exemplary embodiment of a target portable device 40, which may comprise a smart phone, a smart watch, a key-fob, or the like. In the illustrated embodiment, the target portable device 40 comprises a processor 42, memory 44, radio transceivers 46, an I/O interface 48, and a battery 49. The memory 44 is configured to store program instructions that, when executed by the processor 42, enable the target portable device 40 to perform various operations described elsewhere herein, including communicating with the system nodes 20, 30 for the purpose of localizing the target portable device 40. The memory 44 may be of any type of device capable of storing information accessible by the processor 42, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 42 may include a system with a central processing unit, graphics processing units, multiple processing units, dedicated circuitry for achieving functionality, programmable logic, or other processing systems.

The radio transceiver(s) 46 at least include an ultra-wideband transceiver and corresponding antenna configured to communicate with the system nodes 20, 30, as well as any processors, memories, oscillators, or other hardware conventionally included in a UWB radio module. The radio transceiver(s) 46 may further include various other devices configured for wireless communication with other electronic devices, including the ability to send communication signals and receive communication signals. In at least one embodiment, the radio transceivers 46 include a Bluetooth® or BLE transceiver configured to communicate with the master ECU 30 and/or certain ones of the slave system nodes 20 also having a BLE transceiver. In one embodiment, the transceivers 46 further include additional transceivers which are common to smart phones and/or smart watches, such as Wi-Fi transceivers and transceivers configured to communicate via for wireless telephony networks. The I/O interface 48 includes software and hardware configured to facilitate communications with the one or more interfaces (not shown) of the target portable device 40, such as tactile buttons, switches, and/or toggles, touch screen displays, microphones, speakers, and connection ports. The battery 49 is configured to power the various electronic devices of the target portable device 40 and may comprise a replaceable or rechargeable battery.

Ranging and Localization of the Target Portable Device

The ultra-wideband transceivers of the system nodes 20, 30 and of the target portable device 40 can be used to localize the target portable device 40. Particularly, as mentioned above, the vehicle access system 10 is configured to localize the target portable device 40 in order to provide passive entry/passive start (PEPS) features. In addition, the vehicle access system 10 is configured to self-learn the installation locations of the system nodes 20, 30 within the vehicle in scenarios in which one or more of the slave system nodes have unknown installation locations within the vehicle 12, such as when the slave system nodes are newly installed or replaced in the vehicle 12.

Figure 3:
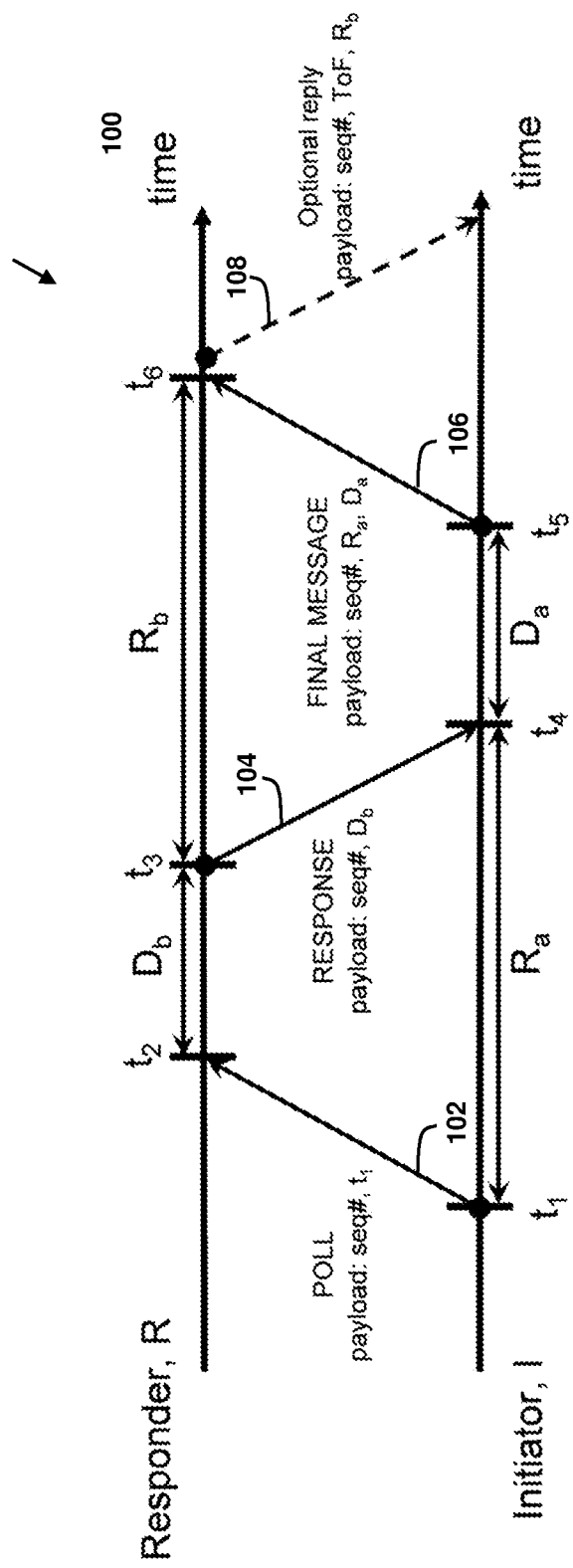
FIG. 3 illustrates one way ranging (OWR), two way ranging (TWR), and symmetric double-sided two way ranging (SDS-TWR) processes for determining a distance between two devices.

FIG. 3 illustrates a process 100 for determining a distance between two devices, an initiator I and a responder R, each of which may correspond to one of the slave system nodes 20, the master ECU 30, or the target portable device 40. Particularly, both the localization of the target portable device 40 and the localization of slave system nodes 20 having unknown installation locations involve determining distances from one device to another device. A distance from a given system node 20, 30 to the target portable device 40 or to another of the system nodes 20, 30 can be computed by measuring a time of flight for a message communicated between the devices. Time of flight (ToF) is the amount of time taken by the message to go from one device to the other. A distance between the devices is estimated based on the ToF, given that the message was travelling at speed of light. There are a few different ways to calculate the ToF, which are illustrated in FIG. 3, one way ranging (OWR), two way ranging (TWR), and symmetric double-sided two way ranging (SDS-TWR).

For one way ranging (OWR), the initiator I sends a poll message 102 with a timestamp $t_1$, at which the initiator I started transmitting. The responder R receives the poll message 102 and records a timestamp $t_2$ at which the responder R received the poll message 102. The responder R (or other device) calculates the ToF as a difference between the two timestamps $t_1$ and $t_2$ (i.e., ToF=$t_2-t_1$). A distance between the initiator I and the responder R can be calculated according to the equation $d_{I \rightarrow R}=c \times ToF$, where c is the speed of light.

We note that, for the one way ranging process to accurately estimate ToF, the clocks of both the initiator I and the responder R must be accurately synchronized. To avoid the synchronization requirement of the one way ranging process, a two way ranging (TWR) process can be used. Here, the initiator I sends the poll message 102 with a sequence number seq# and the timestamp $t_1$. The sequence number seq# is used to differentiate between successive transmissions. Particularly, when messages are not received by the responder R due to bad channel, the responder R needs to know what message it is responding to. The responder R then replies by sending a response message 104 with the sequence number seq# and an expected wait time $D_b$ between the timestamp $t_2$ at which the responder R received the poll message 102 and a timestamp $t_3$ at which the responder R sends the response message 104 (i.e., $D_b=t_3-t_2$).

The initiator I receives the response message 104 and records a timestamp $t_4$ at which the initiator I received the response message 104. The initiator I calculates its overall round trip time $R_a$ as a difference between the timestamp $t_1$, at which the initiator I sent the poll message 102 and the timestamp $t_4$, at which the initiator I received the response message 104 (i.e., $R_a=t_4-t_1$). The initiator I (or other device) calculates the ToF as half the difference between the overall round trip time $R_a$ and the wait time $D_b$ (i.e., ToF=$(R_a-D_b)/2$). We note that the response message 104 can also be used to determine the ToF using the one way ranging process above (i.e., ToF=$t_4-t_3$). Thus, the two way ranging process can be thought of as performing two different one way ranging processes and determining the ToF as an average.

Finally, for an even more accurate estimation of time of flight, a symmetric double-sided two way ranging (SDS-TWR) process can be used. Particularly, this process mitigates effects of additional delays introduced into the system, such as antenna delays, clock delays, delays caused by the environment, etc. In this scheme, in addition after the two way ranging process, the initiator I sends a final message 106 to the responder R with the sequence number seq#, the round trip time $R_a$ and its own expected wait time $D_a$ between the timestamp $t_4$ at which the initiator I received the response message 104 and a timestamp $t_5$ at which the initiator I sends the final message 106 (i.e., $D_a=t_5-t_4$). The responder R receives the final message 106 and records a timestamp $t_6$ at which the responder R received the final message 106. The responder R calculates its overall round trip time $R_b$ as a difference between the timestamp $t_3$, at which it the responder R sent the response message 104 and the timestamp $t_6$, at which the responder R received the final message 106 (i.e., $R_b=t_6-t_3$). The responder R (or other device) calculates the ToF according to the equation ToF= $(R_aR_b-D_aD_b)/(R_a+R_b+D_a+D_b)$, or equivalent. We note that the response message 104 and final message 106 can also be used to determine the ToF using the two way ranging process above (i.e., ToF=$(R_b-D_a)/2$). Thus, the symmetric double-sided two way ranging process can be thought of as performing two different two way ranging processes and determining the ToF as an average. In some embodiments, the responder R can also send an optional reply message 108 to the initiator I with the sequence number seq#, the calculated ToF, and the round trip time $R_b$.

During localization of the target portable device 40, the target portable device 40 can be either one of the initiator I or the responder R. Once distances have been measured between the target portable device 40 and several system nodes 20, 30 having known positions, the location of the target portable device 40 can be calculated by trilateration according to a set of spherical equations in the form of $(x_I-x_R)^2+(y_I-y_R)^2+(z_I-z_R)^2=d_{I \rightarrow R}^2$, where in each case $(x_I, y_I, z_I)$ is the position of the respective initiator I or $(x_R, y_R, z_R)$ is the position of the respective responder R. However, without additional information, distances to the target device from a minimum of four system nodes 20, 30 having known locations are generally required for 3D localization. Likewise, without additional information, distances to the target portable device 40 from a minimum of three system nodes 20, 30 having known locations are generally required for 2D localization.

In an alternative embodiment, the target portable device 40 can be localized by multilateration based on a time difference of arrival (TDoA) of a message from a target portable device 40 by several system nodes 20, 30 having known locations. Particularly, in this embodiment, the target portable device 40 broadcasts a blink message. A plurality of the system nodes 20, 30 receive the blink message and each record a respective timestamp at which the respective system node 20, 30 received the blink message. Since each system node 20, 30 is arranged at a different location within the vehicle, the blink message is received by the system nodes 20, 30 at different times depending on their respective distance from the target portable device 40. Distances between the target portable device 40 and each of the system nodes 20, 30 that received the blink message, as well as the location of the target portable device 40 can be calculated according to a set of hyperboloid equations.

It will be appreciated that additional methods for ranging between devices and for localizing the target portable device 40 may also be used. However, in any case, the position of each system node 20, 30 within the vehicle 12 must be determined before the vehicle access system 10 can successfully localize the target portable device 40 for the purpose of providing passive entry/passive start (PEPS) features.

Self-Learning of System Node Positions within the Vehicle

As discussed above, the vehicle access system 10 is advantageously configured to provide self-learning of the installation locations of the system nodes 20, 30 within the vehicle 12. This is particularly useful, for example, after manufacturing assembly of the vehicle or after a maintenance repair process. Particularly, since each of the slave system nodes 20 perform essentially the same function and generally include the same hardware, it is advantageous for all (or at least most) of the slave system nodes 20 to be a common interchangeable part in order to reduce the complexity and cost of manufacture or repair. However, if all or most of the slave system nodes 20 are a common interchangeable part, then all or most of slave system nodes 20 have unknown installation locations after being newly installed or replaced in the vehicle 12. Thus, the vehicle access system 10 must have a mechanism for uniquely identifying each of the slave nodes 20 and associating the unique identity each slave node 20 with the particular installation location within the vehicle 12 at which the respective slave node 20 has been installed.

Figure 4:
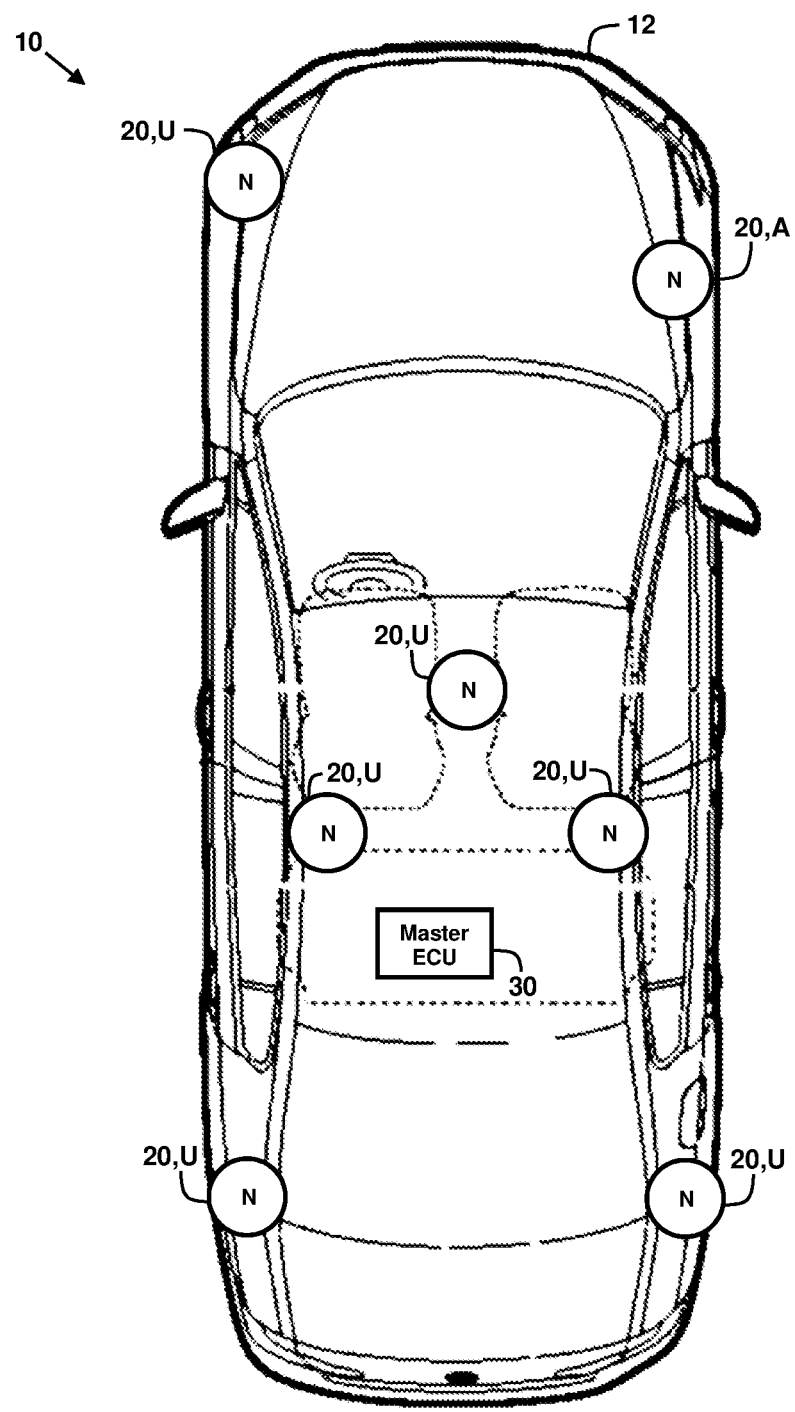
FIG. 4 shows exemplary assigned and unassigned system nodes the vehicle access system of FIG. 1.

FIG. 4 shows the vehicle access system 10 having the plurality of system nodes 20, 30, with several features omitted in comparison to FIG. 1 for simplicity. The vehicle access system 10 advantageously includes at least one slave system node 20 that is uniquely installed at a first predetermined location within the vehicle 12, which is also referred to herein the assigned system node A. In the illustrated example, the first predetermined location at which the assigned system node A is installed is in the front of the vehicle on the passenger side. However, the assigned system node A can, in principle, be installed anywhere within the vehicle that is not symmetric with respect to the arrangement of the other system nodes 20, 30 within the vehicle 12. As used herein, installation location being "symmetric" with respect to the arrangement of the other system nodes 20, 30 means that a line can be drawn through the installation location such at the locations of other system nodes 20, 30 on one side of the line mirror the locations of other system nodes 20, 30 on the opposite side of the line. Conversely, "asymmetric" means that such a line cannot be drawn.

Likewise, the master ECU 30 is uniquely installed at a second predetermined location within the vehicle 12. In the illustrated example, the second predetermined location at which the master ECU 30 is installed is near a back seat on the driver side of the vehicle, off set with respect to a longitudinal axis of the vehicle 12. However, the master ECU 30 can, in principle, be installed anywhere within the vehicle that is not symmetric with respect to the arrangement of the other system nodes 20, 30 within the vehicle 12. In this way, both the assigned system node A and the master ECU 30 have a known installation location within the vehicle 12.

The remaining slave system nodes 20, which are also referred to herein as the unassigned system nodes U, are installed arbitrarily at any one of a plurality predetermined possible installation locations within the vehicle 12. In this way, it is known that the unassigned system nodes U are installed at one of a limited set of possible installation locations within the vehicle 12, but it is unknown which particular unassigned system node U is installed in each respective possible installation location. As discussed below in greater detail, the known installation locations of the assigned system node A and the master ECU 30 can be used to learn the particular installation locations of each unassigned system node U.

In at least one embodiment, the assigned system node A is a unique part that is not interchangeable with the common part that comprises the unassigned system nodes U. In one embodiment, the assigned system node A has a connector that is mechanically keyed to pair with a connector at the first predetermined location within the vehicle 12 at the such that only the unique part that comprises the assigned system node A can be installed at the first predetermined location within the vehicle 12. In another embodiment, the assigned system node A has a connector a single PIN that is tied to a battery line, tied to ground, or tied open, such that the assigned system node A has a unique wiring connection and can be uniquely identified by detecting the way in which the single PIN is connected. In another embodiment, the assigned system node A includes a Bluetooth® or BLE transceiver, as described above, which enables the installation location of the assigned system node A to be known.

Figure 5:
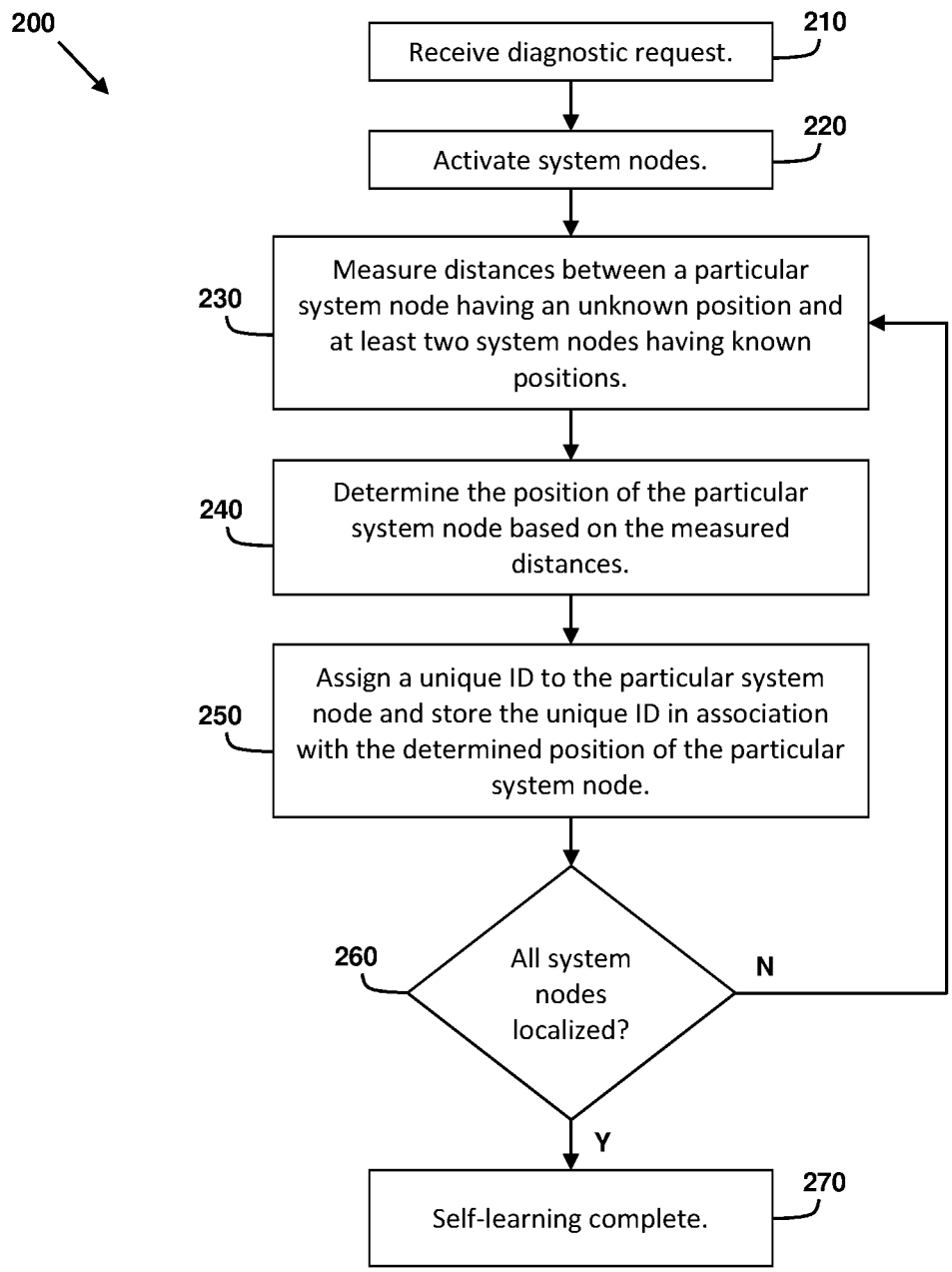
FIG. 5 shows a logical flow diagram for a method of operating a vehicle access system to localize unassigned system nodes.

FIG. 5 shows a logical flow diagram for a method 200 of operating a vehicle access system to localize unassigned system nodes in the vehicle. In the description of the method, statements that a method, process, processor, and/or system is performing some task or function refers to a controller or processor (e.g., the processor 22 of a slave system node or the processor 32 of the master ECU 30) executing programmed instructions stored in non-transitory computer readable storage media (e.g., the memory 24 of a slave system node or the memory 34 of the master ECU 30) operatively connected to the controller or processor to manipulate data or to operate one or more components in the vehicle access system 10 to perform the task or function. Additionally, the steps of the methods may be performed in any feasible chronological order, regardless of the order shown in the figures or the order in which the steps are described.

The method 200 begins with a step of receiving a diagnostic request (block 210). Particularly, the processor 32 of the master ECU 30 is configured to receive a diagnostic request message indicating that installation locations of unassigned system nodes U of the vehicle access system 10 should be learned or re-learned, such after manufacturing assembly or repair of the vehicle access system 10 and/or the vehicle 12. In some embodiments, a processor of the BCM 50 transmits the diagnostic request message to the master ECU 30 via the second communication bus 62. In further embodiments, a processor of the diagnostic computer and/or port 70 transmits the diagnostic request message to the master ECU 30 via the second communication bus 62. The processor 32 of the master ECU 30 receives the diagnostic request message via the second communication bus 62. In at least one embodiment, the diagnostic request message is in the form of a CAN message.

Alternatively, in one embodiment, in which the master ECU 30 is paired with the target portable device 40, such as via Bluetooth® or BLE, the processor 42 of the target portable device 40 operates the transceiver(s) 46 to transmit the diagnostic request message to the master ECU 30. The processor 32 of the master ECU 30 operates the transceiver(s) 36 to receive the diagnostic request message from the target portable device 40.

In another embodiment, in which the a slave system node 20 is paired with the target portable device 40, such as via Bluetooth® or BLE, the processor 42 of the target portable device 40 operates the transceiver(s) 46 to transmit the diagnostic request message to the slave system node 20. The processor 22 of the slave system node 20 operates the transceiver(s) 26 to receive the diagnostic request message from the target portable device and forwards the diagnostic request message to the master ECU 30 via the first communication bus 60. Finally, the processor 32 of the master ECU 30 receives the diagnostic request message via the first communication bus 60.

The diagnostic request message may also be provided to the master ECU 30 by any other suitable communication mechanism, such as in response to technician toggling a physical switch and/or pressing a button arranged in the vehicle 12, or in an automated manner that is responsive to installation and/or connection of an unassigned system node U into the vehicle 12.

The method 200 continues with a step of activating system nodes (block 220). Particularly, in response to receiving the diagnostic request message, the processor 32 of the master ECU 30 transmits an activation message to the slave system nodes 20 (which includes the assigned system node A and the unassigned system nodes U) via the first communication bus 60. In at least one embodiment, the activation message is in the form of a CAN message. The processor 22 of each slave system node 20 receives the activation message via the first communication bus 60. In response to receiving the activation message, the processor 22 of each slave system node 20 activates the respective slave system node 20. In at least one embodiment, activating the slave system node 20 includes turning on or providing power to one or more transceivers 26 and/or antennas, in particular the ultra-wideband transceiver and/or antenna, of the slave system node 20. In addition, activating the slave system node 20 may include operating one or more transceivers 26, in particular the ultra-wideband transceiver, of the slave system node 20 to transmit and/or broadcast a poll message, as described above with respect to FIG. 3, such that the slave system node 20 operates as the initiator I to initiate a ranging process. Likewise, activating the slave system node 20 may include operating one or more transceivers 26, in particular the ultra-wideband transceiver, of the slave system node 20 to listen for and/or receive a poll message to from another system node 20, 30, as described above with respect to FIG. 3, such that the slave system node 20 operates as the responder R in a ranging process.

In one embodiment, after activating the slave system nodes, the processor 32 of the master ECU 30 assigns a unique identifier to the assigned system node A and stores the unique identifier in the memory 34 in association with the predetermined installation location of the assigned system node A.

With continued reference to FIG. 5, once the slave system nodes are activated, the method 200 continues with performing a localization process for each of the unassigned system nodes (blocks 230-250) until all of the system nodes are localized (block 260). Particularly, as discussed above, after manufacturing assembly or repair, the assigned system node A and the master ECU 30 have a known installation location within the vehicle 12. However, the unassigned system nodes U may be installed arbitrarily at any one of a plurality of predetermined possible installation locations within the vehicle 12, such that they have unknown installation locations within the vehicle after manufacturing assembly or repair. The known installation locations of the assigned system node A and the master ECU 30 are used to learn the particular installation locations of each unassigned system node U. The localization of each unassigned system node U can be performed sequentially in a random or predefined order, or in a partially parallel manner.

Each localization process begins with a step of measuring distances between a particular system node having an unknown position and at least two system nodes having known positions (block 230). Particularly, the processor 32 of the master ECU 30 operates a particular unassigned system node U to be localized to perform and/or participate in a ranging process with at least two system nodes 20, 30 having known locations. The at least two system nodes 20, 30 having known locations may include the master ECU 30 or the assigned system node A, which have predetermined locations, as well as any unassigned system nodes U that have been localized in previous iterations of the localization process of the method 200. In at least one embodiment, the processor 32 of the master ECU 30 transmits a message, such as a CAN message, via the first communication bus 60 to the respective unassigned system node U that is to be localized commanding it to perform and/or participate in a ranging process. Likewise, the processor 32 of the master ECU 30 operates at least two system nodes 20, 30 having known locations to perform and/or participate in the ranging process with particular unassigned system node U to be localized. In at least one embodiment, the processor 32 of the master ECU 30 transmits a message, such as a CAN message, via the first communication bus 60 to the system node(s) 20 having known locations commanding it/them to perform and/or participate in a ranging process.

The processor 22 of the unassigned system node U to be localized operates one or more transceivers 26 thereof, in particular the ultra-wideband transceiver, to transmit and receive messages, as described above with respect to FIG. 3, to perform a ranging process with each of the at least two system nodes 20, 30 having known locations. Likewise, the processors 22, 32 of the at least two system nodes 20, 30 having known locations operate one or more transceivers 26, 36 thereof, in particular the ultra-wideband transceiver, to transmit and receive messages, as described above with respect to FIG. 3, to perform a ranging process with the unassigned system node U to be localized. The ranging processes may comprise any combination of the ranging processes described above with respect to FIG. 3, as well as any other ranging processes known in the art.

It will be appreciated that, at least for the first iteration of the localization process of the method 200, the only system nodes 20, 30 having known locations are the master ECU 30 and the assigned system node A. Thus, a first ranging process is performed between the unassigned system node U to be localized and the master ECU 30 to determine a first distance and a second ranging process is performed between the unassigned system node U to be localized and the assigned system node A to determine a first distance. In some embodiments, a third ranging process is performed between the assigned system node A and the master ECU 30 to determine a baseline distance. Alternatively, the baseline distance between the assigned system node A and the master ECU 30 may already be known and is stored in the memory 34 of the master ECU 30. However, the baseline distance may not be necessary, depending on the localization technique to be applied.

After each ranging process is complete, the processors 22 of the unassigned system node U and/or the assigned system node A transmit a message, such as a CAN message, via the first communication bus 60 to the master ECU 30 that includes any necessary ranging data or measurements, such as the various time stamps, wait times, round trip times, calculated times of flight, or calculated distances discussed above with respect to FIG. 3. Alternatively, the ranging data or measurements can be transmitted wirelessly in the form of an optional final reply message (such as the reply message 108). In some embodiments, the processor 32 of the master ECU 30 calculates, based on the ranging data or measurements, the first distance between the unassigned system node U to be localized and the master ECU 30 and the second distance between the unassigned system node U to be localized and the assigned system node A.

Figure 6:
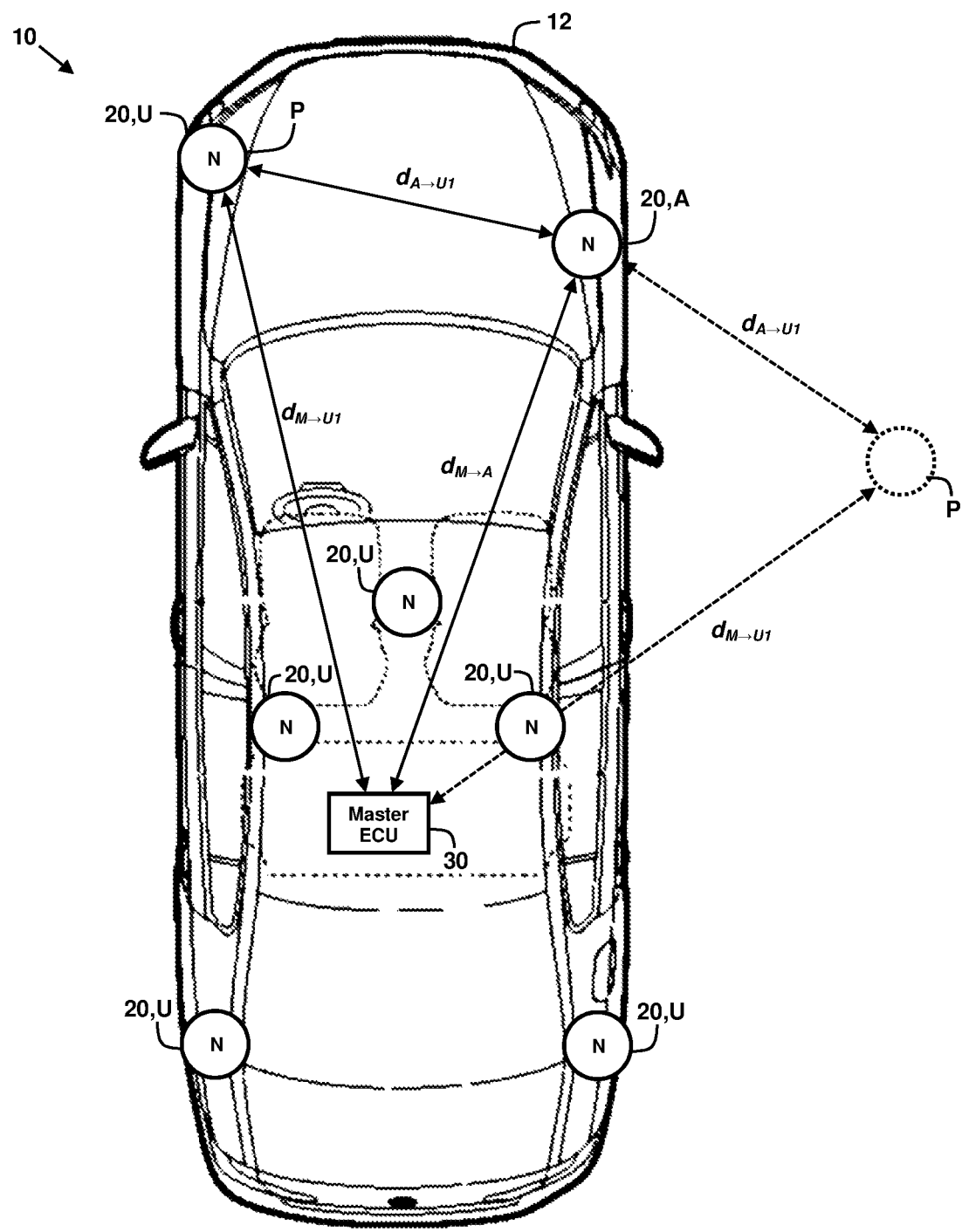
FIG. 6 shows an exemplary trilateration process for localizing an unassigned system node.

FIG. 6 shows an exemplary trilateration process for localizing an unassigned system node. Particularly, ranging processes are performed with respect to a particular unassigned system node U, which is located near to front wheel on the driver's side. However, it will be appreciated that any of the unassigned system nodes U can be localized first. The particular unassigned system node U and the master ECU 30 work in concert to determine a distance $d_{M \to U1}$ between the particular unassigned system node U and the master ECU 30. Similarly, the particular unassigned system node U and the assigned system node A work in concert to determine a distance $d_{A \to U1}$ between the particular unassigned system node U and the assigned system node A. If not already known, the master ECU 30 and the assigned system node A may work in concert to determine a baseline distance $d_{M \to A}$ between the master ECU 30 and the assigned system node A. However, this baseline distance $d_{M \to A}$ is not required to trilateration based localization techniques.

Returning to FIG. 5, once the first and second distances are determined, the localization process continues with a step of determining the position of the particular system node based on the measured distances (block 240). Particularly, the processor 32 of the master ECU 30 determines the installation location of the unassigned system node U based on the determined first and second distances, based on the known installation locations of the system nodes 20, 30 having known locations, and based on the plurality of predetermined possible installation locations within the vehicle 12. Particularly, in at least one embodiment, the memory 34 of the master ECU 30 stores the predetermined installation location of the master ECU 30, the predetermined installation location of assigned system node A, and the plurality of predetermined possible installation locations within the vehicle 12. The installation locations may, for example, be stored in the form of Cartesian coordinates (x, y, z), or equivalent. Based on determined distances and the known installation locations, the processor 32 of the master ECU 30 calculates a set of possible locations of the unassigned system node U and compares it with the plurality of predetermined possible installation locations within the vehicle 12 to determine where unassigned system node U is in fact installed.

Returning to the example of FIG. 6, once at least the distances $d_{M \to U1}$ and $d_{A \to U1}$ are known, the processor 32 of the master ECU 30 calculates possible locations P at which the particular unassigned system node U might be located. In at least one embodiment, the processor 32 of the master ECU 30 calculates the possible locations P by trilateration according to a set of spherical equations in the form of:

$$(x_M-x_{U1})^2+(y_M-y_{U1})^2+(z_M-z_{U1})^2=d_{M\to U1}^2 \text{ and}$$

$$(x_A-x_{U1})^2+(y_A-y_{U1})^2+(z_A-z_{U1})^2=d_{A\to U1}^2,$$

where $(x_M, y_M, z_M)$ is the predetermined installation location of the master ECU 30, $(x_A, y_A, z_A)$ is the predetermined installation location of the assigned system node A, and $(x_{U1}, y_{U1}, z_{U1})$ is a possible location of the particular unassigned system node U. Notably, in two-dimensional space as illustrated in FIG. 6, two possible locations P exist that satisfy the spherical equations. In three-dimensional space, there are an unlimited number of possible locations P that satisfy the spherical equations.

In order to discriminate between the ambiguous possible solutions P to the spherical equations, the processor 32 of the master ECU 30 compares the possible locations P to the plurality of predetermined possible installation locations within the vehicle 12 to determine where unassigned system node U is in fact installed. In other words, the processor 32 of the master ECU 30 identifies the possible location P that corresponds to an actual installation location at which an unassigned system node might be installed. In further embodiments, additional localization techniques may be used to determine the possible locations P, such as triangulation or multilateration.

In alternative embodiments, since all possible installation locations are fixed, the distances between each possible installation location are also fixed. Accordingly, in some embodiments, the memory 34 of the master ECU 30 stores the distances between each of the installation locations (including the predetermined installation locations of the master ECU 30 and the assigned system node A). Rather than solve the spherical equations described above, the processor 32 of the master ECU 30 compares the measured distances from particular unassigned system node U with the known distances stored in the memory 34 to identify the installation location at which particular unassigned system node U is installed. In other words, The processor 32 of the master ECU 30 identifies the set of fixed distances stored in the memory 34 that match the measured distances to identify the installation location at which particular unassigned system node U is installed Returning to FIG. 5, the localization process concludes with a step of assigning a unique ID to the particular system node and storing the unique ID in association with the determined position of the particular system node (block 250). Particularly, once the particular unassigned system node U has been localized, the processor 32 of the master ECU 30 assigns a unique identifier to the particular unassigned system node U and stores the unique identifier in the memory 34 in association with the identified installation location of the particular unassigned system node U. In one embodiment, the processor 32 of the master ECU 30 assigns sequential numerical and/or alphanumerical identifiers to the unassigned system nodes U as each is localized. Alternatively, the processor 32 of the master ECU 30 uses a unique numerical and/or alphanumerical serial number or the like that is provided to the master ECU 30 by the unassigned system nodes U themselves. In at least one embodiment, the unique identifier is used by the particular unassigned system node U to uniquely identify itself when communicating with the master ECU 30 and other system nodes 20 via the communication bus 60, such as during a localization process of the target portable device 40.

The method 200 continues with a step of checking whether all system nodes have been localized (block 260). If all system nodes have not been localized, then the method 200 repeats the localization process (blocks 230-250) for a further system node having an unknown location. Otherwise, if the all system nodes have been localized, then the method 200 is complete (block 270). Particularly, after localizing each unassigned system node U and assigning a unique identify, the processor 32 of the master ECU 30 checks if all unassigned system nodes U have been localized and identified. If any unassigned system node U has yet to be localized, the processes described above are repeated to localize the next unassigned system node U. It will be appreciated that, as more and more unassigned system nodes U are localized, additional or differing localization techniques may be applied. However, in principle, the same technique described above can be used to localize all of the unassigned system nodes U.

Once all unassigned system nodes U have been localized, the self-learning process is complete and the vehicle access system 10 can be used to localize the target portable device 40 to provide passive entry/passive start features and functionality, as described above. Particularly, once the locations of all of the system nodes 20, 30 are known, the processor 32 of the master ECU 30 operates the system nodes 20, 30 to perform a ranging process with respect to the target portable device 40. The processor 32 of the master ECU 30 receives ranging data or measurements from the slave system nodes 20 and calculates the position of the target portable device 40, as described above with respect to FIG. 3. In one embodiment, the processor 32 of the master ECU 40 transmits a message, such as a CAN message, to the BCM 50 (or other vehicle computer) via the communication bus 62 that indicates the current position of the target portable device 40. In one embodiment, the processor of the BCM 50 (or other vehicle computer) operates vehicle locks, enables vehicle ignition, or performs other such functions based on the current position of the target portable device 40.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a vehicle access system of a vehicle, the vehicle access system having a plurality of system nodes installed throughout the vehicle, each system node in the plurality of system nodes including a radio transceiver configured to wirelessly communicate with each other system node in the plurality of system nodes and with a target portable device, the plurality of system nodes including (i) a first system node installed at first installation location within the vehicle, (ii) a second system node installed at second installation location within the vehicle, and (iii) a plurality of additional system nodes, each additional system node in the plurality of additional system nodes being installed at a different one of a plurality of possible installation locations within the vehicle, the method comprising:

determining, for a third system node from the plurality of additional system nodes, (a) a first distance between the third system node and the first system node by operating the radio transceivers of the third system node and the first system node and (b) a second distance between the third system node and the second system node by operating the radio transceivers of the third system node and the second system node; and determining, with a processor of the vehicle access system, a third installation location, selected from the plurality of possible installation locations, at which the third system node is actually installed based on the first distance and the second distance.

2. The method according to claim 1, the determining the third installation location at which the third system node is actually installed further comprising:

determining the third installation location based on the first distance, the second distance, the first installation location, and the second installation location.

3. The method according to claim 2, the determining the third installation location at which the third system node is actually installed further comprising:

determining at least two possible positions based on the first distance, the second distance, the first installation location, and the second installation location;

comparing the at least two possible positions with the plurality of possible installation locations within the vehicle; and determining the third installation location as one of the at least two possible positions that corresponds to one of the plurality of possible installation locations.

4. The method according to claim 3, the determining the at least two possible positions further comprising:

determining the at least two possible positions using trilateration based on the first distance, the second distance, the first installation location, and the second installation location.

5. The method according to claim 2, the determining the third installation location at which the third system node is actually installed further comprising:

determining the third installation location based on a comparison of the first distance and the second distance with known distances, stored in a memory of the vehicle access system, at least one of (I) between the plurality of possible installation locations and the first installation location and (II) known distances between the plurality of possible installation locations and the second installation location.

6. The method according to claim 1 further comprising, for each of the plurality of additional system nodes other than the third system node:

determining respective distances between the respective additional system node and at least two other system nodes from the plurality of system nodes by operating the radio transceivers of the respective additional system node and the at least two other system nodes; and determining, with the processor of the vehicle access system, a respective installation location, selected from the plurality of possible installation locations, at which the respective additional system node is actually installed based on the respective distances, wherein the at least two other systems nodes are selected from a group consisting of (A) the first system node, (B) the second system node, and (C) all system nodes from the plurality of system nodes for which respective installation locations have previously been determined.

7. The method according to claim 1 further comprising:

determining a location of the target portable device with respect to the vehicle by operating the radio transceivers of the plurality of system nodes.

8. The method according to claim 7 further comprising:

operating at least one component of the vehicle depending on the location of the target portable device.

9. The method according to claim 1, wherein the radio transceiver of each system node of the plurality of system nodes comprises an ultra-wideband transceiver.

10. The method according to claim 1, wherein the first system node is a master system node and is configured to operate the second system node and the plurality of additional system nodes.

11. The method according to claim 10, wherein the processor of vehicle access system is a processor of the master system node.

12. The method according to claim 1, wherein the plurality of system nodes are operably connected to one another by a wired communication bus.

13. The method according to claim 1, wherein the first system node and the second system node are arranged asymmetrically within the vehicle with respect to an overall arrangement of the plurality of system nodes within the vehicle.

14. The method according to claim 1, wherein the second system node has a mechanically keyed connector configured to pair only with a connected at the second installation location within the vehicle.

15. The method according to claim 1, wherein the second system node has a connector in which a least one pin is tied to a battery, is tied to ground, or provides an open voltage, such that the second system node is uniquely identifiable based on the at least one pin, compared to the plurality of additional system nodes.

16. A vehicle access system of a vehicle, the vehicle access system comprising:

a plurality of system nodes installed throughout the vehicle, each system node in the plurality of system nodes including a radio transceiver configured to wirelessly communicate with each other system node in the plurality of system nodes and with a target portable device, the plurality of system nodes including (i) a first system node installed at first installation location within the vehicle, (ii) a second system node installed at second installation location within the vehicle, and (iii) a plurality of additional system nodes, each additional system node in the plurality of additional system nodes being installed at a different one of a plurality of possible installation locations within the vehicle; and a processor operably connected to the plurality of system nodes, the processor configured to:

determine, for a third system node from the plurality of additional system nodes, (a) a first distance between the third system node and the first system node by operating the radio transceivers of the third system node and the first system node and (b) a second distance between the third system node and the second system node by operating the radio transceivers of the third system node and the second system node; and determine a third installation location, selected from the plurality of possible installation locations, at which the third system node is actually installed based on the first distance and the second distance.

17. The vehicle access system according to claim 16, wherein the radio transceiver of each system node of the plurality of system nodes comprises an ultra-wideband transceiver.

18. The vehicle access system according to claim 16, wherein the first system node is a master system node and is configured to operate the second system node and the plurality of additional system nodes.

19. The vehicle access system according to claim 18, wherein the processor of vehicle access system is a processor of the master system node.

20. The vehicle access system according to claim 16, wherein the first system node and the second system node are arranged asymmetrically within the vehicle with respect to an overall arrangement of the plurality of system nodes within the vehicle.

* * * * *